Dec. 9, 1958   A. C. LIND ET AL   2,863,564
EXTENSIBLE HEADER FOR CLARIFICATION TANKS
Filed Aug. 2, 1956   5 Sheets-Sheet 1

INVENTORS
ARTHUR C. LIND
GILBERT W. QUAST
TOM J. KOESKE
BY
Ernst W. Schultz
ATTORNEY Dec. 9, 1958   A. C. LIND ET AL   2,863,564
EXTENSIBLE HEADER FOR CLARIFICATION TANKS
Filed Aug. 2, 1956   5 Sheets-Sheet 2
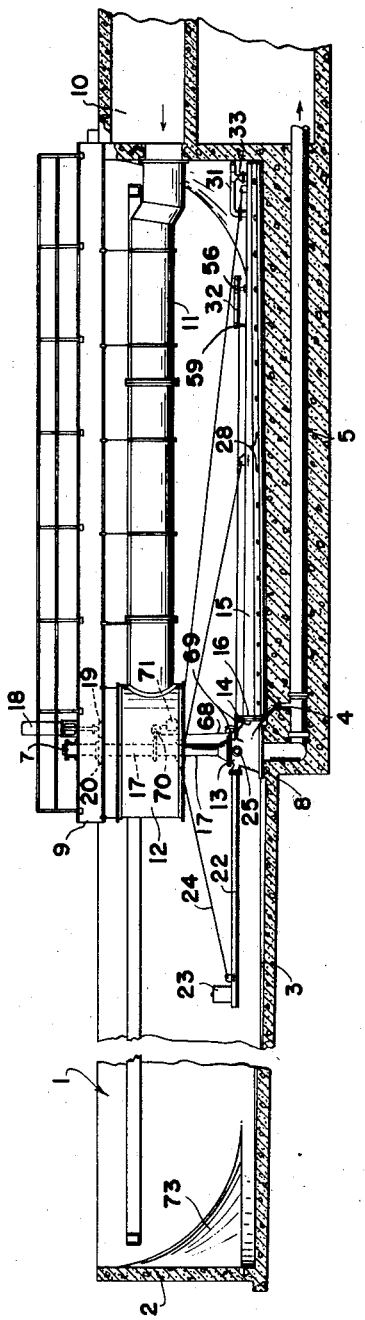
FIG. 2.
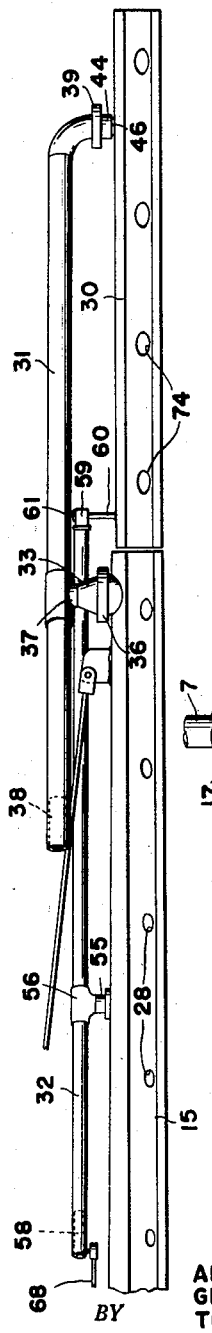
FIG. 3.
FIG. 4.
INVENTORS
ARTHUR C. LIND
GILBERT W. QUAST
TOM J. KOESKE
BY
Ernst W. Schultz
ATTORNEY

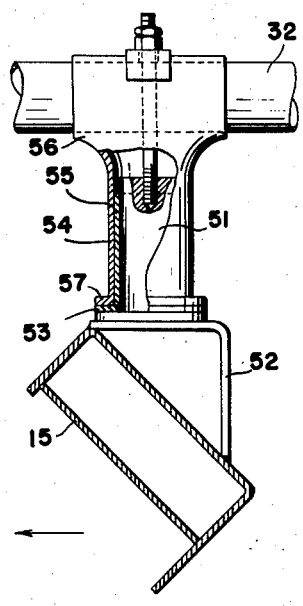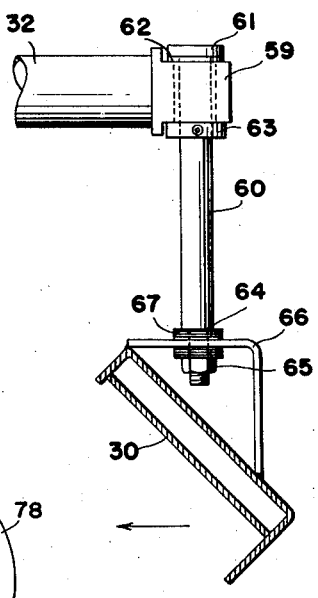

INVENTORS
ARTHUR C. LIND
GILBERT W. QUAST
TOM J. KOESKE
BY Ernst W. Schultz
ATTORNEY

United States Patent Office 2,863,564
Patented Dec. 9, 1958

2,863,564

EXTENSIBLE HEADER FOR CLARIFICATION TANKS

Arthur C. Lind, Wauwatosa, Gilbert W. Quast, Brookfield, and Tom J. Koeske, Milwaukee, Wis., assignors to Chain Belt Company, Milwaukee, Wis., a corporation of Wisconsin Application August 2, 1956, Serial No. 601,826

11 Claims. (Cl. 210—529)

This invention relates to the removal of a given liquid or suspended solid from a settling or clarification tank by hydraulic eduction means and particularly to the eduction tube which comprises a header supported horizontally and extending radially from the center of the tank and which rotates about a vertical axis to operate over a circular area. Such a header preferably has a cross-section and a series of openings of predetermined sizes to effect the uniform withdrawal of the liquid or suspended solid from the circular area referred to. The tank is therefore necessarily or preferably of a corresponding circular form and size.

The principal object of the present invention is to provide an extensible header to reach the corners of a square tank or any irregular area between the wall of the tank and the circular area referred to and with means automatically controlling such extension so that the removal of the given liquid or suspended solid is similarly uniform as to such irregular area. The removal of the given liquid or suspended solid uniformly from the entire area of the tank is desired so that a given rate of withdrawal can be established corresponding to the rate at which the liquid or suspended solid accumulates in the tank and so that only the desired liquid or suspended solid is withdrawn.

Square or rectangular tanks particularly in multiple installations are preferred for their more effective use of the space available and their less cost in such cases.

The present invention has particular application in the continuous treatment of sewage where the suspended solids or sludge must be removed from the water in the tank within a given time after settling out. Devices which merely scrape out the corners of a square tank necessarily cause accumulations at other locations and are therefore not entirely satisfactory for such reasons and purposes. Furthermore, the movement of such scrapers causes turbulence which adversely affects the efficiency of their operation.

Accordingly, a further object of the invention is to provide for the removal of the sludge uniformly and at a regular rate from the bottom of a rectangular settling tank with as little excess water as possible and with as little disturbance of the water in the tank as possible.

Another object is to allow the tank to have a flat bottom with only such pitch as is required for drainage in cleaning.

Another object is to provide suction means for removal of the sludge which operates from a support at the center of the tank and adjusts itself automatically to the operation required for a tank of rectangular or other dimensions.

Another object is to allow ease of installation, inspection and cleaning of the parts within the tank.

Acording to the invention as shown and described, two spaced, parallel beams of equal length are pivotally supported near the outer end of the header and pivotally carry an extension arm for movement in an arc and radially respecting the header from an inner position directly behind the header to an extended position generally in line with or alongside the outer end of the header.

One of the beams comprises a pipe having rotatable couplings connecting the same with the arm and the header. One of the couplings includes a valve which is normally closed when the arm is in the inner position and behind the header and which is open when the arm is in the outer position. The valve renders the extension arm progressively inoperative as it moves behind the header and would otherwise partly operate to withdraw water from the area from which the header had already withdrawn the sludge. As the extension arm moves into the corners of the tank and outside of the area reached by the header, the valve is gradually opened and the extension arm becomes operative to remove the sludge therefrom. As the extension arm again moves behind the header the valve is again closed.

The drawings furnished herewith illustrate several modes of carrying out the invention as presently contemplated and set forth hereinafter.

In the drawings:

Fig. 2 is a vertical sectional view taken through the tank with the forward face of the header and extension arm shown in elevation;

Fig. 3 is an enlarged elevation of the outer end of the header and extension arm in the extended position;

Fig. 4 is an enlarged elevation of the rotatable member and the inner end of the header connected thereto;

Fig. 5 is an enlarged vertical section taken through the rotatable coupling which connects the outer end of the header with the pipe-beam supporting the arm for movement relative to the header;

Fig. 6 is an enlarged elevation of the rotatable coupling which connects the arm and the pipe-beam adjustably supporting the arm and with parts thereof broken away and sectioned;

Fig. 7 is an enlarged view of the bearing carried by the header for rotatably supporting the guide-beam and with parts thereof broken away and sectioned;

Fig. 8 is an enlarged view of the bearing adjustably supporting the extension arm from the guide-beam;

Fig. 9 is a plan view of one of the two discs which are disposed within the coupling as shown in Fig. 5 and relatively movable to regulate the pipe according to the position of the extension arm relative to the header;

Figure 1:
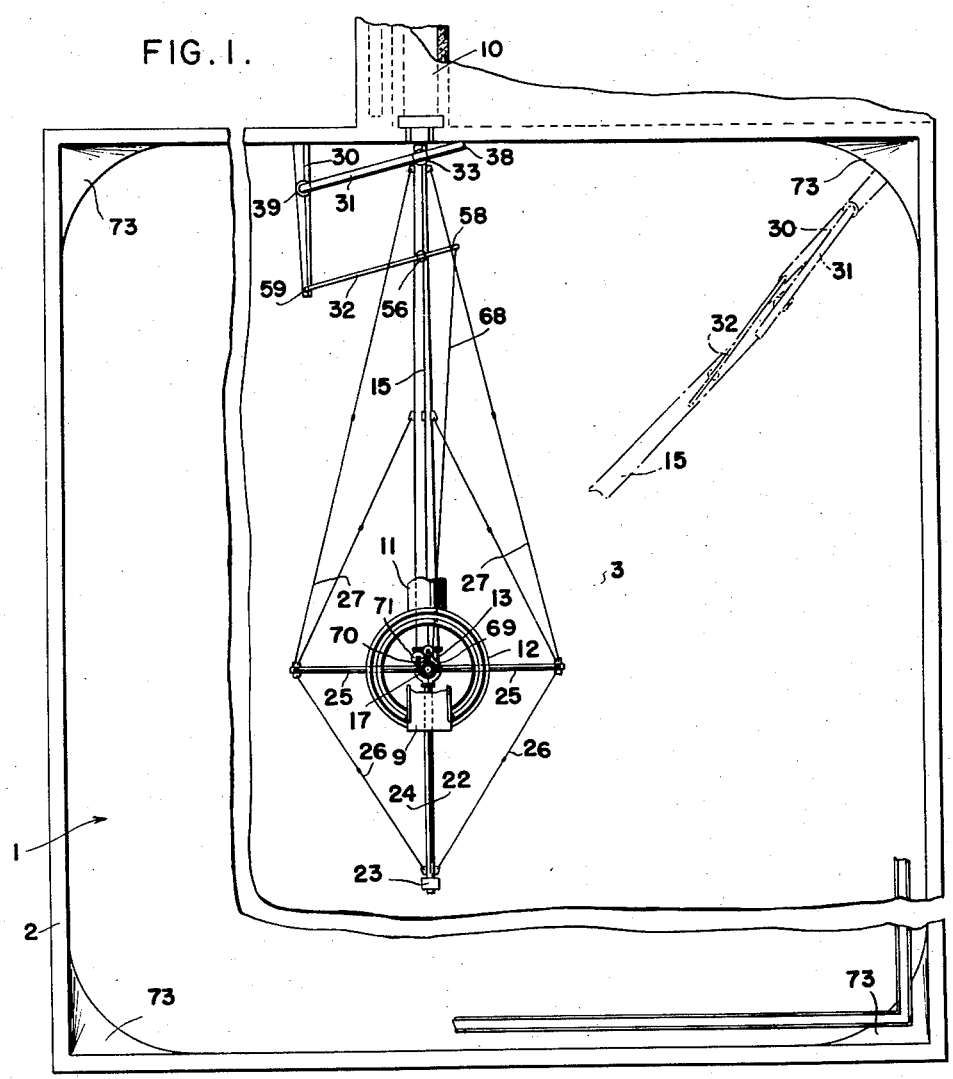
Figure 1 is a fragmentary plan view of a generally square tank and a rotating header having two parallel beams supporting an extension arm. The arm and outer end of the header are also shown in dotted lines at a corner of the tank where the arm is fully extended.

The square settling tank 1 shown in the drawings is of reinforced concrete construction, and includes the vertical side walls 2 of equal length and the same height and the bottom 3 having only a slight pitch toward the drain 4 adjacent to the geometrical center of the tank. The draw-off pipe 5 set within the bottom 3 and below the floor of tank 1 has a small pipe 6 opening at the drain 4 which is normally closed except for cleaning of the tank. Pipe 5 is connected to the lower end of the vertical pipe standard 7 which is securely set at the center of tank 1 in the concrete base 8 forming a part of the tank bottom. Standard 7 provides the elevated support of one end of the bridge 9. The other end of bridge 9 is supported on the top of a wall 2 of tank 1 adjacent to the inlet channel 10 which is provided to receive the mixed liquor or sewage requiring separation. The influent pipe 11 which is supported by and beneath bridge 9 communicates at one end with channel 10 and opens into the circular feedwell 12. Feedwell 12 extends concentrically around standard 7 and has a lower, annular opening for the introduction of the sewage into the tank with a minimum of turbulence.

The collar-bearing 13 supported directly on base 8 and rotatably mounted on the lower portion of standard 7 is fitted with the pipe coupling flange 14 and communicates with draw-off pipe 5 through suitable openings, not shown, in the standard. The larger end of the header 15 has a corresponding flange 16 secured to flange 14 and the opposite smaller end of the header is closed.

The drive tube 17 assembled on standard 7 for turning collar-bearing 13 is fixed at its lower end to the collar-bearing and extends upwardly through feedwell 12 to the drive mechanism for rotating the tube which includes the motor 18 carried by the upper end of standard 7 and the drive pinion 19 meshing with gear 20 fixed to the upper end of drive-tube 17.

The arm 22 extending from collar-bearing 13 oppositely of header 15 carries the counterweight 23 and is connected to drive-tube 17 by the rod 24 to counterbalance the weight of the header. Braces 25 fixed to collar-bearing 13 at right angles to arm 22 and header 15 carry the bracing rods 26 and 27 providing the lateral support of arm 22 and header 15.

Header 15 is provided with the series of openings 28 which are of different relative sizes generally corresponding to their distance from the axis of rotation of the header and their relative speeds of travel or the area of the tank floor reached during a given time, and are progressively larger toward the outer end of the header. The cross-section of the header is progressively larger toward the end of the header connected to collar-bearing 13 to accommodate the fact the sludge volume is considerably greater in the portion of the header nearer the center of the tank. The balance between the taper of the header and the increase in orifice size is proportioned to insure uniform velocities in the header.

The header shown in the drawings is similar in the same and other respects to that described and claimed in application Serial No. 590,939, filed June 12, 1956, by R. T. Steindorf for Sediment Eductors for Settling Chambers.

According to the present invention, the extension arm 30 is carried by header 15 at the outer end thereof by the supporting pipes 31 and 32 for relative movement in a horizontal plane and operates to remove the sludge from the area adjacent to the walls of the tank and outside the circular area reached by the header.

Pipe 31 is supported at the outer end of header 15 by the rotatable pipe coupling 33 comprising, as shown in Fig. 5 the upper and lower flanged members 34 and 35, respectively, and the ring 36 which joins the flanges while allowing relative pivotal movement of the two parts. The lower member 35 of coupling 33 is fixed to header 15 so that upper member 34 is rotatable on a vertical axis and so that pipe 31 connected by the fitting 37 to upper member 34 is provided pivotal movement on a vertical axis. The end of pipe 31 extending forwardly of header 15 carries the counter-weight 38 and the other end of pipe 31 extending rearwardly of the header opens downwardly and is fitted with the flange 39 and ring 40 carrying the bearing member 41 in the annular groove 42 therebetween.

The flange 43 rotatably supported on bearing 41 within groove 42 carries the tube 44 extending downwardly from the end of pipe 31 and the lower end of tube 44 is fitted with the inner ring-seal 45 which adjustably receives the smaller tube 46 fixed to extension arm 30. The bolts 47 and 48 joining brackets 49 and 50 respectively fixed to tubes 44 and 46 provide the vertical adjustment of extension arm 30 with respect to pipe 31.

The pintle 51 vertically disposed above header 15 is secured thereto a given distance from coupling 33 by the bracket 52 and carries the bearing washer 53 at the fixed lower end of the pintle. The bushing 54 fitting pintle 51 with the sleeve bearing 55 therebetween is connected to pipe 32 by fitting 56 and has a lower flange 57 engaging bearing washer 53 which provides the vertical support of pipe 32 for movement in a horizontal plane and on the axis of the pintle and sleeve bearing 55.

The forward end of pipe 32 carries the counter-weight 58 and the other end is provided with the fitting 59 which carries the bolt 60. The head 61 of bolt 60 supported by the fitting 59 on the bearing washer 62 is secured by the collar 63 fixed to the bolt beneath fitting 59 and the lower end of bolt 60 which is of reduced size to provide the annular shoulder 64 is threaded to carry the nut 65. The bracket 66 fixed to extension arm 30 includes a flat, horizontal portion having a hole through which the reduced, lower end of bolt 60 extends. The nut 65 secures bracket 66 on bolt 60 with a given or selected number of washers 67 between shoulder 64 and the nut and above and below the bracket to secure the latter and the extension arm at the desired height as provided by bolts 47.

Pipes 31 and 32 provide the support of extension arm 30 generally parallel to header 15 and the movement of the arm relative to the header in the same plane or relationship to the floor of the tank.

The cable 68 passing through pulleys 69 and 70 carried by drive tube 17 connects the weight 71 and the forward end of pipe 32 to urge the outer end of extension arm 30 toward walls 2 of the tank and to maintain the outer end of arm 30 in engagement with the walls 2 of the tank for movement around the tank. As header 15 is rotated and approaches a corner of the tank, weight 71 causes arm 30 to swing outwardly beyond the end of the header as the weight maintains the end of arm 30 in engagement with the wall. As the header moves past the corner of the tank, arm 30 is caused to return to a position behind the header and to lift weight 71.

The movement of arm 30 fully into the corners of the tank may be avoided by rounding the extreme corners with the cement fill 73 which extends diagonally across the corners as shown in the drawings and which advantageously reduces the range of movement and length of arm 30 required for the relatively small area of such corners which is filled.

Arm 30 is provided with the series of openings 74 which are of a size generally corresponding to that of openings 28 at the outer end of header 15. The opening 75 in the top of header 15 at the end thereof communicates with coupling 33 and pipe 31 and the upper opening 76 in the larger, outer end of extension arm 30 communicates with tube 46 and pipe 31 whereby arm 30 is regularly operative with header 15 for the withdrawal of the sludge from the floor of the tank.

The removal of the sludge by arm 30 is controlled by the valve 77 comprising the circular, upper and lower bearing plates 78 and 79 respectively, carried between parts 34 and 35 of coupling 33 and providing the bearing support of pipe 31. The plates are mounted in the annular recess 80 in the upper end of part 35 and are fixed by the pins 81 to rotate with the respective upper and lower parts of the coupling. When arm 30 is located generally behind header 15 the open sectors 82 of each plate are closed by the other plate so that no sludge is drawn from the tank through pipe 31 and arm 30. As arm 30 moves along the wall of the tank and from behind header 15, the open sectors 82 of the bearing plates move into registry with each other and allow a corresponding amount of sludge to be drawn from arm 30 and through pipe 31 into header 15. This amount is generally from the area immediate to arm 30 and beyond the reach of header 15.

When arm 30 is in the fully extended position at the corners of the tank, valve 77 is fully opened. As the arm is again moved behind the header, valve 77 again closes pipe 31 so that the arm does not operate to withdraw water from the area of the tank floor which the header has cleared of sludge. The valve 77 comprising plates 78 and 79 thus maintains the efficiency of operation referred to for any irregular area including that beyond the reach of header 15 for which the extension arm is provided. The complete removal of the sludge is desired to assure that the water passing into the collecting trough 83 is substantially free of sludge.

Figure 10:
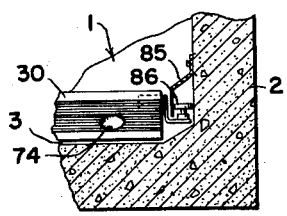
Fig. 10 is a vertical section through a wall of the tank showing a guide rail fixed thereto and a shoe which is carried by the end of the extension arm shown and which is slidable on the rail to guide the arm along the wall of the tank.

If desired, the guide rail 85 may be fixed within the tank as shown in Fig. 10 and spaced from the walls 2 to be engaged by the guide roller or shoe 86 disposed between the rail 85 and the wall 2. The shoe 86 is fixed to the end of arm 30 to cause the latter to move inwardly and outwardly, whereby weight 71 may be eliminated.

Figure 11:
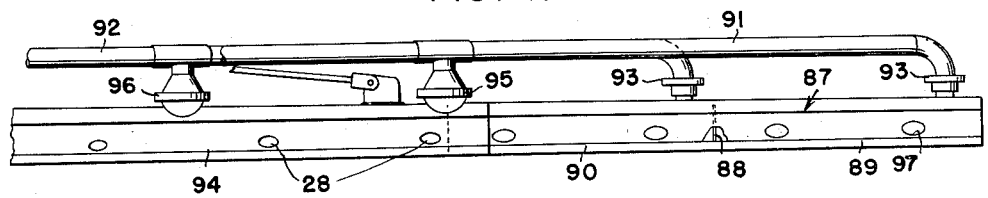
Fig. 11 is a view similar to Fig. 3 wherein the extension arm comprises separately operating sections controlled by two valves, each of which is similar to that shown in Figs. 5 and 9.
Figure 12:
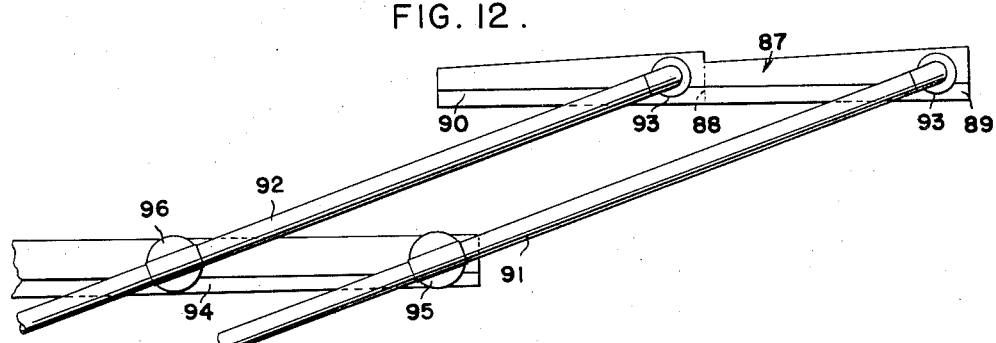
Fig. 12 is a plan view of the extension arm shown in Fig. 11.

In the embodiment of the invention shown in Figs. 11 and 12, the extension arm 87 which is similar to arm 30 is divided by the interior plate 88 to comprise the outer section 89 which includes the end of the arm adjacent to the wall 2 of the tank and the inner section 90 which includes the other end of the arm. The pipes 91 and 92 which are both similar to pipe 31 are respectively connected to arm 87 by the couplings 93 whereby each pipe communicates with a corresponding section of the arm. Pipes 91 and 92 are carried by the header 94 and controlled by the valve units 95 and 96 respectively, which are similar to couplings 33 and include valve means similar valve 77. In the operation of header 94 and as the outer section 89 of arm 87 moves beyond the header, valve 95 opens to cause the withdrawal of sludge through the openings 97 of section 89. Pipe 92 remains closed by valve 96 until section 90 of arm 87 approaches and moves also beyond the outer end of header 94. Valve 95 remains open while valve 96 closes as the arm again returns behind the header. As the outer section 89 of the arm also moves behind the header, valve 95 again closes also. The operation of the two valves provides the close control of each section of the arm for the desired uniform withdrawal of the sludge from the irregular area reached by the extension arm as in the embodiment described above.

Figure 13:
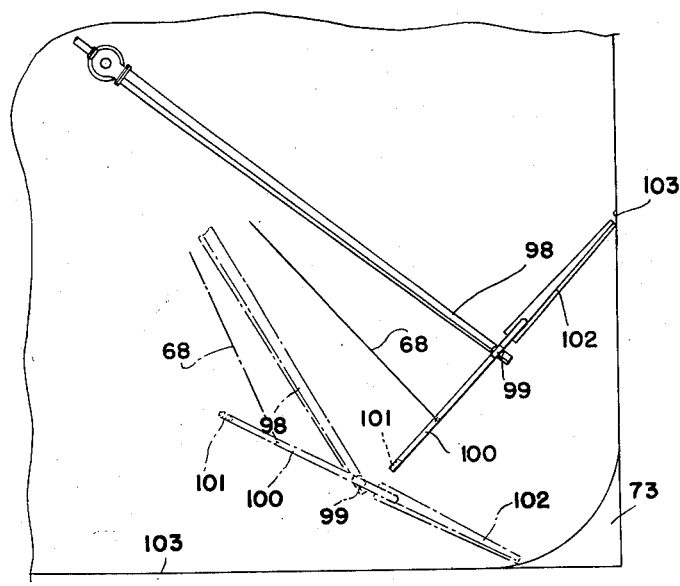
Fig. 13 is a plan view of an extension arm pivotally carried directly by the outer end of the header with the arm and header shown also in dotted lines to illustrate their movement with respect to the inner wall of the tank represented by straight lines.
Figure 14:
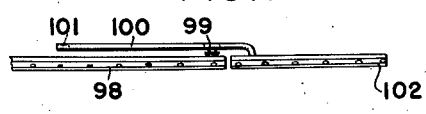
Fig. 14 is a front elevation of the header and the extension arm shown in Fig. 13.

In the embodiment of the invention shown in Figs. 13 and 14, the header 98 is provided with the valve unit 99 at the outer end thereof and which pivotally carries the pipe 100. The forward end of pipe 100 carries a counterweight 101 to balance the weight of the extension arm 102 which is rigidly fixed to the other end of pipe 100 and is pivotally disposed under compulsion of the cable 68 and the counterweight 71 (see Fig. 2) to follow the wall of the tank represented by lines 103. The positions of arm 102 and header 98 relative to each other corresponds generally to the floor area to be reached by the arm and determines the opening and closing of the valve unit 99 which operates in a manner similar to that of valve unit 77 and regulates the withdrawal of sludge by arm 102 at rates which correspond to the extension of the arm for the uniform removal of the sludge from the area referred to as in the embodiments of Figs. 1–9 and Figs. 11 and 12.

Figure 15:
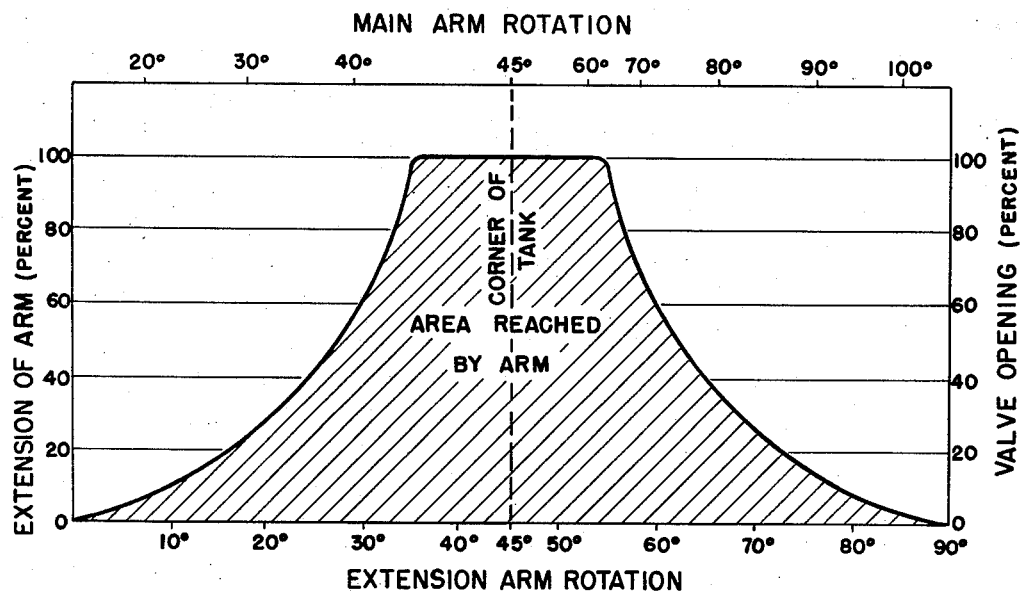
Fig. 15 is a graph showing the general operation of the unit shown in Figs. 1–9.

The graph of Fig. 15 shows the operation of the extension arm 30 of the embodiment shown in Figs. 1–9 and particularly with respect to the operation of valve 77 as header 15 and extension arm 30 move through an arc of 90° as shown by the upper and lower scales which refer to a starting position mid-way between two corners of a square tank. The scale at the left shows the distance between the outer end of the header and the tank walls in terms of percentages of the fully extended length of the arm. The area beneath the curve accordingly corresponds to the area reached by the arm. The scale at the right shows the degree of opening of valve 77 for the position of the arm and header represented by the curve.

Figure 16:
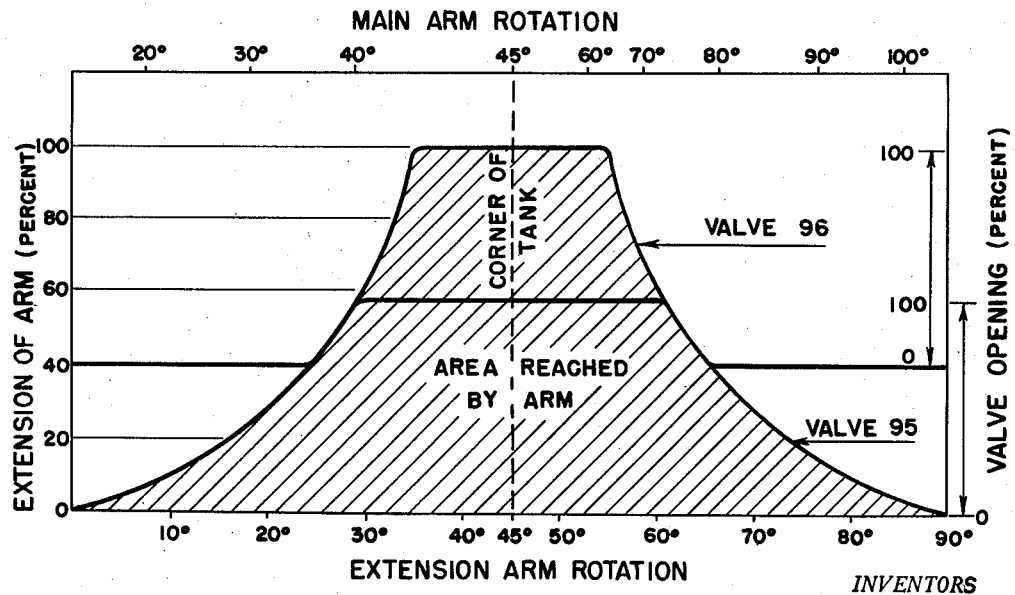
Fig. 16 is a graph showing the general operation of the unit shown in Figs. 11 and 12.

The graph of Fig. 16 is similar to that of Fig. 15 and refers to the embodiment of the invention shown in Figs. 11 and 12 wherein valves 95 and 96 control the operation of separate sections of extension arm 87. The degree of opening of each valve is represented by the separate curves having separate scales at the right side of the graph. The corresponding positions of the header and arm are shown by both curves by reference to the upper and lower scales respectively.

Various modes of carrying out the invention are contemplated as within the scope of the following claims particularly pointing out and distinctly claiming the subject matter which is regarded as the invention.

I claim:

1. In combination with a header for the removal of a given liquid or suspended solid from a settling tank, which header comprises a tube having a series of openings along the length thereof and supporting means at one end thereof and providing movement of the header about the center of the tank in a generally horizontal plane, an extension arm comprising a tube having a series of holes along the length thereof, spaced, parallel arms pivotally supported by and near the other end of said header and pivotally supporting said extension arm for movement relative to the header, hydraulic means connecting said arm and the end of said header opposite said one end thereof for withdrawal of said given liquid or suspended solid, and guide means extending along the walls of the tank and engaged by said extension arm to effect movement of the arm relative to the header and for operation of the extension arm along the wall of the tank and independently of the operation of the header within the circular area reached by the header.

2. In combination with a header having a rotating support at the center of a settling tank, said header comprising a tube suspended horizontally from said support and having a series of openings extending the length thereof for the removal of a given liquid or suspended solid from the circular area of the tank reached by the header, an extension arm hydraulically connected to said header and supported thereby for relative pivotal movement, and guide means defining an area corresponding to the area of the tank and engaged by the extension arm to guide the arm along the wall of the tank, said extension arm having a series of openings for the removal of said given liquid or sludge from the area which is outside of said circular area and the reach of the header, said arm being operable without affecting the operation of the header.

3. In combination with a header having a rotating support at the center of a settling tank, said header comprising a tube suspended horizontally from said support and having a series of openings extending the length thereof for the removal of a given liquid or suspended solid from a circular area of the tank reached by the header, an extension arm having means hydraulically connecting the same to said header and supported thereby for relative pivotal movement, guide means defining an area corresponding to the area of the tank and engaged by the extension arm to guide the arm along the wall of the tank, said extension arm having a series of openings for the removal of said given liquid or solid from the area which is outside of said circular area and the reach of the header, and a valve connected to and controlling said means and the operation of the header according to the position of the arm relative to the header and the extension of the arm from the end of the header to the wall of the tank.

4. In combination with a tube having a rotating support at the center of a settling tank, an extension arm having means hydraulically connecting one end thereof to said tube and supported thereby for relative pivotal movement, stationary guide means defining an area corresponding to the area of the tank and engaged by the other end of said extension arm to guide the arm along the wall of the tank, said extension arm having a series of openings for the removal of a given liquid or suspended solid from the area within the reach of said arm, and a valve connected to and controlling said means and the operation of the arm according to the position of the arm relative to the tube and the extension of the arm from said support to the wall of the tank.

5. Apparatus for the removal of a given liquid or suspended solid from a settling tank comprising, a rotating support at the center of the tank and including a tube carried by said support and connected to a pipe for the withdrawal of said liquid or solid from the tank, an extension arm having means hydraulically connecting one end thereof to said tube and supported thereby for relative pivotal movement, stationary guide means defining an area corresponding to the area of the tank and engaged by the other end of said extension arm to guide the arm along the wall of the tank, said extension arm having a series of openings for the removal of said liquid or suspended solid from the area within the reach of said arm, and a valve connected to and controlling said means and the operation of the arm according to the position of the arm relative to the tube and the extension of the arm from said support to the wall of the tank.

6. In combination with hydraulic means having a rotating member for location at the center of a settling tank and the removal of a given liquid or suspended solid from the area of the tank around said member, an extensible arm hydraulically connected to said member and supported thereby for relative movement radially thereof, guide means defining an area corresponding to the area of the tank and engaged by said arm to guide the arm along the wall of the tank with rotation of said member, said arm having a series of openings for the removal of said given liquid or solid from said area, and a valve connected to and controlling the operation of the arm according to the extension of the arm from said member to the wall of the tank.

7. In combination with a header for the removal of a given liquid or suspended solid from a settling tank, which header comprises a tube having a series of openings along the length thereof and supporting means at one end thereof and providing movement of the header about the center of the tank in a generally horizontal plane, an extension arm comprising a tube having a series of holes along the length thereof, spaced, parallel arms pivotally supported by and near the other end of said header and pivotally supporting said extension arm for movement relative to the header at least one of said arms including hydraulic means connecting said arm and header for withdrawal of said given liquid or suspended solid, means guiding said extension arm to effect movement of the arm relative to the header for operation of the extension arm along the wall of the tank and over the area beyond the reach of the header, and a valve connected to and controlling said hydraulic means and controlled by relative movement of said one of said arms with respect to said header whereby the extension arm is operable in correlation to the area referred to and which is immediate to the arm.

8. In combination with a header having a rotating support at the center of a settling tank, said header comprising a tube suspended horizontally from said support and having a series of openings extending the length thereof for the removal of a given liquid or suspended solid from the circular area of the tank reached by the header, an extension arm hydraulically connected to said header and supported thereby for relative pivotal movement, and means urging the movable end of said arm away from said support to engage the walls of the tank whereby the movement of the arm and said header extends over an area corresponding to the area of the tank, said extension arm having a series of openings for the removal of said given liquid or sludge from the area which is outside of said circular area and the reach of the header, said arm being operable without affecting the operation of the header.

9. In combination with a header having a rotating support at the center of a settling tank, said header comprising a tube suspended horizontally from said support and having a series of openings extending the length thereof for the removal of a given liquid or suspended solid from a circular area of the tank reached by the header, an extension arm comprising at least two separate sections each having a series of openings for the removal of said given liquid or solid from separate areas outside of said circular area and the reach of the header, parallel pipes pivotally supported by said header and supporting said arm for relative movement with respect thereto and for movement of the arm along the walls of the tank, said pipes providing the separate hydraulic communication of each of said sections with said header, and a valve connected to each of said pipes and controlling said sections and the operation of the header according to the position of the arm relative to the header and the extension of the arm from the end of the header to the wall of the tank.

10. Apparatus for removing sediment from the bottom of a settling tank comprising a substantially horizontal header rotatable about a central point in the tank, means communicating with the end of said header adjacent said central point for conducting sediment from the header, said header having ports along the length thereof for the admission of sediment to the header, an extension arm arranged adjacent the outer end of the header having a sediment admission port and hydraulically communicating with said header, said extension arm being arranged to extend into corners of the sedimentation tank to remove sediment depositing on the floor of the tank therein, and adjustable means supporting said extension arm on said header whereby the extension arm may be maintained at proper elevation with respect to the adjacent floor of the tank.

11. In combination with a header for the removal of a given liquid or suspended solid from a settling tank, which header comprises a tube having a series of openings along the length thereof and supporting means at one end thereof and providing movement of the header about the center of the tank in a generally horizontal plane, an extension arm comprising a tube having a series of holes along the length thereof, spaced, parallel arms pivotally supported by and near the other end of said header and pivotally supporting said extension arm for movement relative to the header, hydraulic means connecting said arm and the end of said header opposite said one end thereof for withdrawal of said given liquid or suspended solid, the outer end of said extension arm being adapted to engage the walls of the tank for operation of the extension arm along the wall of the tank and outside of the circular area reach by the header and independently of the operation thereof.

References Cited in the file of this patent

UNITED STATES PATENTS

| | | |
|---|---|---|
| 1,947,429 | Townsend et al. | Feb. 13, 1934 |
| 2,143,441 | Jacobs | Jan. 10, 1939 |
| 2,150,865 | Shafer et al. | Mar. 14, 1939 |
| 2,238,024 | Linch | Apr. 8, 1941 |
| 2,261,487 | Scott et al. | Nov. 4, 1941 |